(12) United States Patent
Jackson

(10) Patent No.: US 8,413,155 B2
(45) Date of Patent: Apr. 2, 2013

(54) SYSTEM AND METHOD FOR A SELF-OPTIMIZING RESERVATION IN TIME OF COMPUTE RESOURCES

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 1633 days.

(21) Appl. No.: 10/530,581

(22) PCT Filed: Mar. 11, 2005

(86) PCT No.: PCT/US2005/008296
§ 371 (c)(1), (2), (4) Date: Aug. 11, 2006

(87) PCT Pub. No.: WO2005/091136
PCT Pub. Date: Sep. 29, 2005

(65) Prior Publication Data
US 2009/0012930 A1    Jan. 8, 2009

Related U.S. Application Data

(60) Provisional application No. 60/552,653, filed on Mar. 13, 2004.

(51) Int. Cl.
*G06F 9/46* (2006.01)
(52) U.S. Cl. ...................................................... 718/104
(58) Field of Classification Search ................... 718/104
See application file for complete search history.

(56) References Cited

U.S. PATENT DOCUMENTS

| | | | |
|---|---|---|---|
| 5,175,800 | A | 12/1992 | Gallis et al. |
| 5,307,496 | A | 4/1994 | Ichinose et al. |
| 5,355,508 | A | 10/1994 | Kan |
| 5,473,773 | A | 12/1995 | Aman et al. |
| 5,504,894 | A | 4/1996 | Ferguson et al. |
| 5,550,970 | A | 8/1996 | Cline et al. |
| 5,826,082 | A | 10/1998 | Bishop et al. |
| 5,881,238 | A | 3/1999 | Aman et al. |

(Continued)

FOREIGN PATENT DOCUMENTS

| | | |
|---|---|---|
| GB | 2392265 | 2/2004 |
| WO | WO 03/060798 | 9/2003 |
| WO | WO 2004/021109 | 3/2004 |
| WO | WO 2004/046919 | 6/2004 |

OTHER PUBLICATIONS

Design and Evaluation of a Resource Selection Framework for Grid Applications Liu et al. High Performance Distributed Computing, 2002.*

(Continued)

*Primary Examiner* — Mengyao Zhe

(57) ABSTRACT

A system and method of dynamically controlling a reservation of resources within a cluster environment to maximize a response time are disclosed. The method embodiment of the invention comprises receiving from a requester a request for a reservation of resources in the cluster environment, reserving a first group of resources, evaluating resources within the cluster environment to determine if the response time can be improved and if the response time can be improved, then canceling the reservation for the first group of resources and reserving a second group of resources to process the request at the improved response time.

28 Claims, 8 Drawing Sheets

U.S. PATENT DOCUMENTS

| | | | |
|---|---|---|---|
| 5,918,017 | A | 6/1999 | Attanasio et al. |
| 5,920,863 | A | 7/1999 | McKeehan et al. |
| 5,933,417 | A | 8/1999 | Rottoo |
| 5,958,003 | A | 9/1999 | Preining et al. |
| 6,003,061 | A * | 12/1999 | Jones et al. ............. 718/104 |
| 6,021,425 | A | 2/2000 | Waldron, III et al. |
| 6,067,545 | A | 5/2000 | Wolff |
| 6,076,174 | A | 6/2000 | Freund |
| 6,088,718 | A | 7/2000 | Altschuler et al. |
| 6,098,090 | A | 8/2000 | Burns |
| 6,101,508 | A | 8/2000 | Wolff |
| 6,167,445 | A | 12/2000 | Gai et al. |
| 6,212,542 | B1 | 4/2001 | Kahle et al. |
| 6,278,712 | B1 | 8/2001 | Takihiro et al. |
| 6,298,352 | B1 | 10/2001 | Kannan et al. |
| 6,314,555 | B1 | 11/2001 | Ndumu et al. |
| 6,324,279 | B1 | 11/2001 | Kamanek, Jr. et al. |
| 6,330,008 | B1 | 12/2001 | Razdow et al. |
| 6,330,583 | B1 | 12/2001 | Reiffin |
| 6,333,936 | B1 * | 12/2001 | Johansson et al. ............. 370/449 |
| 6,334,114 | B1 | 12/2001 | Jacobs et al. |
| 6,366,945 | B1 | 4/2002 | Fong et al. |
| 6,370,154 | B1 | 4/2002 | Wickham |
| 6,374,297 | B1 | 4/2002 | Wolf et al. |
| 6,418,459 | B1 | 7/2002 | Gulick |
| 6,463,454 | B1 | 10/2002 | Lumelsky et al. |
| 6,496,566 | B1 | 12/2002 | Posthuma |
| 6,496,866 | B2 | 12/2002 | Attanasio et al. |
| 6,519,571 | B1 | 2/2003 | Guheen et al. |
| 6,526,442 | B1 | 2/2003 | Stupek, Jr. et al. |
| 6,564,261 | B1 | 5/2003 | Gudjonsson et al. |
| 6,571,215 | B1 | 5/2003 | Mahapatro |
| 6,584,489 | B1 | 6/2003 | Jones et al. |
| 6,587,938 | B1 | 7/2003 | Eilert et al. |
| 6,590,587 | B1 | 7/2003 | Wichlman et al. |
| 6,662,202 | B1 | 12/2003 | Krusche et al. |
| 6,662,219 | B1 | 12/2003 | Nishanov et al. |
| 6,687,257 | B1 | 2/2004 | Balasubramanian |
| 6,690,400 | B1 | 2/2004 | Moayyad et al. |
| 6,760,306 | B1 | 7/2004 | Pan et al. |
| 6,771,661 | B1 | 8/2004 | Chawla et al. |
| 6,829,762 | B2 | 12/2004 | Arimilli et al. |
| 6,912,533 | B1 * | 6/2005 | Hornick ............. 707/700 |
| 6,925,431 | B1 | 8/2005 | Papaefstathiou |
| 6,938,256 | B2 | 8/2005 | Deng et al. |
| 6,948,171 | B2 | 9/2005 | Dan et al. |
| 6,966,033 | B1 | 11/2005 | Gasser et al. |
| 6,975,609 | B1 | 12/2005 | Khaleghi et al. |
| 6,985,937 | B1 | 1/2006 | Keshav et al. |
| 7,003,414 | B1 | 2/2006 | Wichelman et al. |
| 7,035,230 | B1 | 4/2006 | Shaffer et al. |
| 7,072,807 | B2 | 7/2006 | Brown et al. |
| 7,124,410 | B2 | 10/2006 | Berg et al. |
| 7,143,168 | B1 | 11/2006 | DiBiasio et al. |
| 7,145,995 | B2 | 12/2006 | Oltmanns et al. |
| 7,168,049 | B2 | 1/2007 | Day |
| 7,177,823 | B2 | 2/2007 | Lam et al. |
| 7,185,073 | B1 | 2/2007 | Gai et al. |
| 7,188,174 | B2 | 3/2007 | Rolia et al. |
| 7,191,244 | B2 | 3/2007 | Jennings et al. |
| 7,197,561 | B1 | 3/2007 | Lovy et al. |
| 7,222,343 | B2 | 5/2007 | Heyman et al. |
| 7,236,915 | B2 | 6/2007 | Algieri et al. |
| 7,289,619 | B2 | 10/2007 | Vivadelli et al. |
| 7,296,268 | B2 | 11/2007 | Darling et al. |
| 7,308,687 | B2 | 12/2007 | Trossman et al. |
| 7,328,406 | B2 | 2/2008 | Kalinoski et al. |
| 7,353,495 | B2 | 4/2008 | Somogyi |
| 7,376,693 | B2 | 5/2008 | Neiman et al. |
| 7,386,586 | B1 | 6/2008 | Headley et al. |
| 7,386,850 | B2 | 6/2008 | Mullen |
| 7,403,994 | B1 | 7/2008 | Vogl et al. |
| 7,423,971 | B1 | 9/2008 | Mohaban et al. |
| 7,502,747 | B1 | 3/2009 | Pardo et al. |
| 7,502,884 | B1 | 3/2009 | Shah et al. |
| 7,516,455 | B2 | 4/2009 | Matheson et al. |
| 7,546,553 | B2 | 6/2009 | Bozak et al. |
| 7,568,199 | B2 | 7/2009 | Bozak et al. |
| 7,640,547 | B2 | 12/2009 | Neiman et al. |
| 7,716,193 | B2 | 5/2010 | Krishnamoorthy |
| 2002/0007389 | A1 | 1/2002 | Jones et al. |
| 2002/0031364 | A1 | 3/2002 | Suzuki et al. |
| 2002/0087699 | A1 | 7/2002 | Karagiannis et al. |
| 2002/0099842 | A1 | 7/2002 | Jennings et al. |
| 2002/0116234 | A1 | 8/2002 | Nagasawa |
| 2002/0120741 | A1 | 8/2002 | Webb et al. |
| 2002/0156904 | A1 | 10/2002 | Gullotta et al. |
| 2002/0166117 | A1 | 11/2002 | Abrams et al. |
| 2003/0005130 | A1 | 1/2003 | Cheng |
| 2003/0018766 | A1 | 1/2003 | Duvvuru |
| 2003/0018803 | A1 | 1/2003 | El Batt et al. |
| 2003/0028645 | A1 | 2/2003 | Romagnoli |
| 2003/0061260 | A1 | 3/2003 | Rajkumar |
| 2003/0061262 | A1 | 3/2003 | Hahn et al. |
| 2003/0088457 | A1 * | 5/2003 | Keil et al. ............. 705/10 |
| 2003/0126200 | A1 | 7/2003 | Wolff |
| 2003/0131043 | A1 | 7/2003 | Berg et al. |
| 2003/0135615 | A1 | 7/2003 | Wyatt |
| 2003/0135621 | A1 | 7/2003 | Romagnoli |
| 2003/0154112 | A1 | 8/2003 | Neiman et al. |
| 2003/0158884 | A1 | 8/2003 | Alford |
| 2003/0169269 | A1 | 9/2003 | Sasaki et al. |
| 2003/0182425 | A1 | 9/2003 | Kurakake |
| 2003/0185229 | A1 | 10/2003 | Shachar et al. |
| 2003/0200109 | A1 | 10/2003 | Honda et al. |
| 2003/0212792 | A1 | 11/2003 | Raymond |
| 2003/0216951 | A1 | 11/2003 | Ginis et al. |
| 2003/0217129 | A1 | 11/2003 | Knittel et al. |
| 2003/0233378 | A1 | 12/2003 | Butler et al. |
| 2003/0233446 | A1 | 12/2003 | Earl |
| 2004/0030741 | A1 | 2/2004 | Wolton et al. |
| 2004/0044718 | A1 | 3/2004 | Ferstl et al. |
| 2004/0064817 | A1 | 4/2004 | Shibayama et al. |
| 2004/0103339 | A1 | 5/2004 | Chalasani et al. |
| 2004/0103413 | A1 | 5/2004 | Mandava et al. |
| 2004/0107281 | A1 | 6/2004 | Bose et al. |
| 2004/0117768 | A1 | 6/2004 | Chang et al. |
| 2004/0139202 | A1 | 7/2004 | Talwar et al. |
| 2004/0139464 | A1 | 7/2004 | Ellis et al. |
| 2004/0196308 | A1 | 10/2004 | Blomquist |
| 2004/0199918 | A1 * | 10/2004 | Skovira ............. 718/102 |
| 2004/0205101 | A1 | 10/2004 | Radhakrishnan |
| 2004/0215780 | A1 | 10/2004 | Kawato |
| 2004/0216121 | A1 | 10/2004 | Jones et al. |
| 2004/0236852 | A1 | 11/2004 | Birkestrand et al. |
| 2004/0244006 | A1 | 12/2004 | Kaufman et al. |
| 2004/0260746 | A1 | 12/2004 | Brown et al. |
| 2005/0027864 | A1 | 2/2005 | Bozak et al. |
| 2005/0050270 | A1 | 3/2005 | Horn et al. |
| 2005/0071843 | A1 | 3/2005 | Guo et al. |
| 2005/0155033 | A1 | 7/2005 | Luoffo et al. |
| 2005/0228892 | A1 | 10/2005 | Riley et al. |
| 2005/0256942 | A1 | 11/2005 | McCardle et al. |
| 2005/0278760 | A1 | 12/2005 | Dewar et al. |
| 2005/0283534 | A1 | 12/2005 | Bigagli et al. |
| 2005/0283782 | A1 | 12/2005 | Lu et al. |
| 2006/0013132 | A1 | 1/2006 | Garnett et al. |
| 2006/0097863 | A1 | 5/2006 | Horowitz et al. |
| 2006/0200773 | A1 | 9/2006 | Nocera et al. |
| 2006/0236368 | A1 | 10/2006 | Raja et al. |
| 2006/0271552 | A1 | 11/2006 | McChesney et al. |
| 2006/0294238 | A1 | 12/2006 | Naik et al. |
| 2007/0204036 | A1 | 8/2007 | Mohaban et al. |
| 2008/0168451 | A1 | 7/2008 | Challenger et al. |
| 2008/0184248 | A1 | 7/2008 | Barua et al. |
| 2008/0216082 | A1 | 9/2008 | Eilam et al. |
| 2008/0288873 | A1 | 11/2008 | McCardle et al. |
| 2009/0216881 | A1 | 8/2009 | Lovy et al. |

OTHER PUBLICATIONS

A Language Modeling Framework for Resource Selection and Results Merging Si et al. CIKM 2002, Proceedings of the eleventh international conference on Iformation and Knowledge Management.*

Concepts for Resource Reservation in Advance Wolf et al. Multimedia Tools and Applications, 1997.*

Chuang Liu et al. "Design and Evaluation of a Resource Selection Framework for Grid Applications" High Performance Distributed Computing, 2002. HPDC-11 2002. Proceedings S. 11$^{th}$ IEEE International Symposium on Jul. 23-26, 2002, Piscataway, NJ, USA IEEE, Jul. 23, 2002, pp. 63-72, XP010601162 ISBN: 978-0-7695-1686-8.

Lars C. Wolf et al. "Concepts for Resource Reservation in Advance" Multimedia Tools and Applications. [Online] 1997, pp. 255-278, XP009102070 The Netherlands Retreived from the Internet: URL: [retrieved on Jun. 23, 2008].

Luo et al. "A Language Modeling Framework for Resource Selection and Results Merging", Conference on Information and Knowledge Management. 2002 ACM pp. 391-397.

Leinberger, W. et al., "Gang Scheduling for Distributed Memory Systems", University of Minnesota—Computer Science and Engineering—Technical Report, Feb. 16, 2000, vol. TR 00-014.

Brad Stone et al., UNIX Fault Management: A Guide for System Administration, Dec. 1, 1999, ISBN 0-13-026525-X, http://www.informit.com/content/images/013026525X/samplechapter/013026525.pdf.

IBM Tivoli Workload Scheduler job Scheduling Console User's Guide Feature Level 1.2 (Maintenance Release Oct. 2003). Oct. 2003, IBM Corporation, http://publib.boulder.ibm.com/tividd/td/TWS/SH19-4552-01/en_US/PDF/jsc_user.pdf.

Chen et al., "A flexible service model for advance reservation", Computer Networks, Elsevier science publishers, vol. 37, No. 3-4, pp. 251-262. Nov. 5, 2001.

Roy, Alain, "Advance Reservation API", University of Wisconsin-Madison, GFD-E.5, Scheduling Working Group, May 23, 2002.

Supercluster Research and Development Group, "Maui Administrator's Guide", Internet citation, 2002.

Snell, et al., "The Performance Impact of Advance Reservation Meta-scheduling", pp. 137-153, Springer-Verlag Berlin Heidelberg, 2000.

Chase et al., "Dynamic Virtual Clusters in a Grid Site Manager", Proceedings of the 12$^{th}$ IEEE International Symposium on High Performance Distributed Computing (HPDC'03), 2003.

* cited by examiner

FIG. 7

| Create Reservation | |
|---|---|
| Reservation Information | Reservation TimeFrame |
| Reswervation ID | ☑ Once — Runs Only Once |
| Owner: USER:scott | Start Time |
| Partition | End Time |
| Node Features | ☐ Daily — Runs Once A Day |
| Floating Reso... | Days |
| | Start Time |
| Access Control List | End Time |
| Account | ☐ Weekly — Runs Once A Week |
| Class/Queue | Start Day |
| User | End Day |
| Group | ☐ Infinite — Runs Infinitely |
| QoS | |
| Assign Resources | Event Triggers |
| Host List/Exp... | Create Trigger 1 · Create Trigger 4 |
| Search Resources | Create Trigger 2 · Create Trigger 5 |
| Tasks — Create Tasks | Create Trigger 3 · Create Trigger 6 |

Reservation Flags
— Select Reservation Flags —
☐ Best Effort  ☐ By Name  ☐ Force
☐ Single Use  ☐ Owner Preempt
☐ Preemptee  ☐ Space Flex
☐ Time Flex  ☐ Exclusive

[ Save ]  [ Cancel ]

SYSTEM AND METHOD FOR A SELF-OPTIMIZING RESERVATION IN TIME OF COMPUTE RESOURCES

PRIORITY CLAIM

The present application claims priority to U.S. Provisional Application No. 60/552,653 filed Mar. 13, 2004, the contents of which are incorporated herein by reference.

RELATED APPLICATIONS

The present application is related to U.S. patent application Ser. Nos. 10/530,583; 10/530,582; 10/530,577 PCT App. No. PCT/US 05/08288); U.S. patent application Ser. Nos. 10/530, 576; 10/589,339; 10/530,578; 10/530,580, and 10/530,575, filed on the same day as the present application. The content of each of these cases is incorporated herein by reference.

BACKGROUND OF THE INVENTION

1. Field of the Invention

The present invention relates to reservations in a cluster or more specifically to a system and method of providing a self-optimizing reservation in time of compute resources.

2. Introduction

The present invention relates to a system and method of allocation resources in the context of a grid or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring grid resources over time in order to run grid applications as efficiently as possible. Each project will utilize a different set of resources and thus is typically unique. In addition to the challenge of allocating resources for a particular job, grid administrators also have difficulty obtaining a clear understanding of the resources available, the current status of the grid and available resources, and real-time competing needs of various users. One aspect of this process is the ability to reserve resources for a job. A cluster manager will seek to reserve a set of resources to enable the cluster to process a job at a promised quality of service.

General background information on clusters and grids may be found in several publications. See, e.g., *Grid Resource Management. State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will comprise a plurality of clusters as will be shown in FIG. 1A. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment the configuration of the cluster environment and also losses in efficiency with the fragmentation associated with meeting particular policies.

To manage the jobs submissions, a cluster scheduler will employ reservations to insure that jobs will have the resources necessary for processing. FIG. 11 illustrates a cluster/node diagram for a cluster 124 with nodes 120. Time is along the X axis. An access control list 114 (ACL) to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. The deficiency with this approach is that there are situations in which organizations would like to make resources available but only in such a way as to balance or meet certain performance goals. Particularly, groups may want to establish a constant expansion factor and make that available to all users or they may want to make a certain subset of users that are key people in an organization and want to give them special services but only when their response time drops below a certain threshold. Given the prior art model, companies are unable to have the flexibility over their cluster resources.

To improve the management of cluster resources, what is needed in the art is a method for a scheduler, a cluster scheduler or cluster workload management system to manage resources in a dimensional addition to space. Furthermore, given the complexity of the cluster environment, what is needed is more power and flexibility in the reservations process.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention includes systems, methods and computer-readable media embodiments. The method aspect of the invention comprises a method of dynamically controlling a reservation of resources within a compute environment to maximize a response time. The compute environment may be a cluster, grid or any environment of a plurality of compute devices. The method comprises receiving from a requestor a request for a reservation of resources in the cluster environment, reserving a first group of resources and evaluating resources within the cluster environment to determine if the response time can be improved. If the response time can be improved, the method comprises canceling the reservation for the first group of resources and reserving a second group of resources to process the request at the improved response time.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates an interface for creating a reservation.

DETAILED DESCRIPTION OF THE INVENTION

Figure 1A:
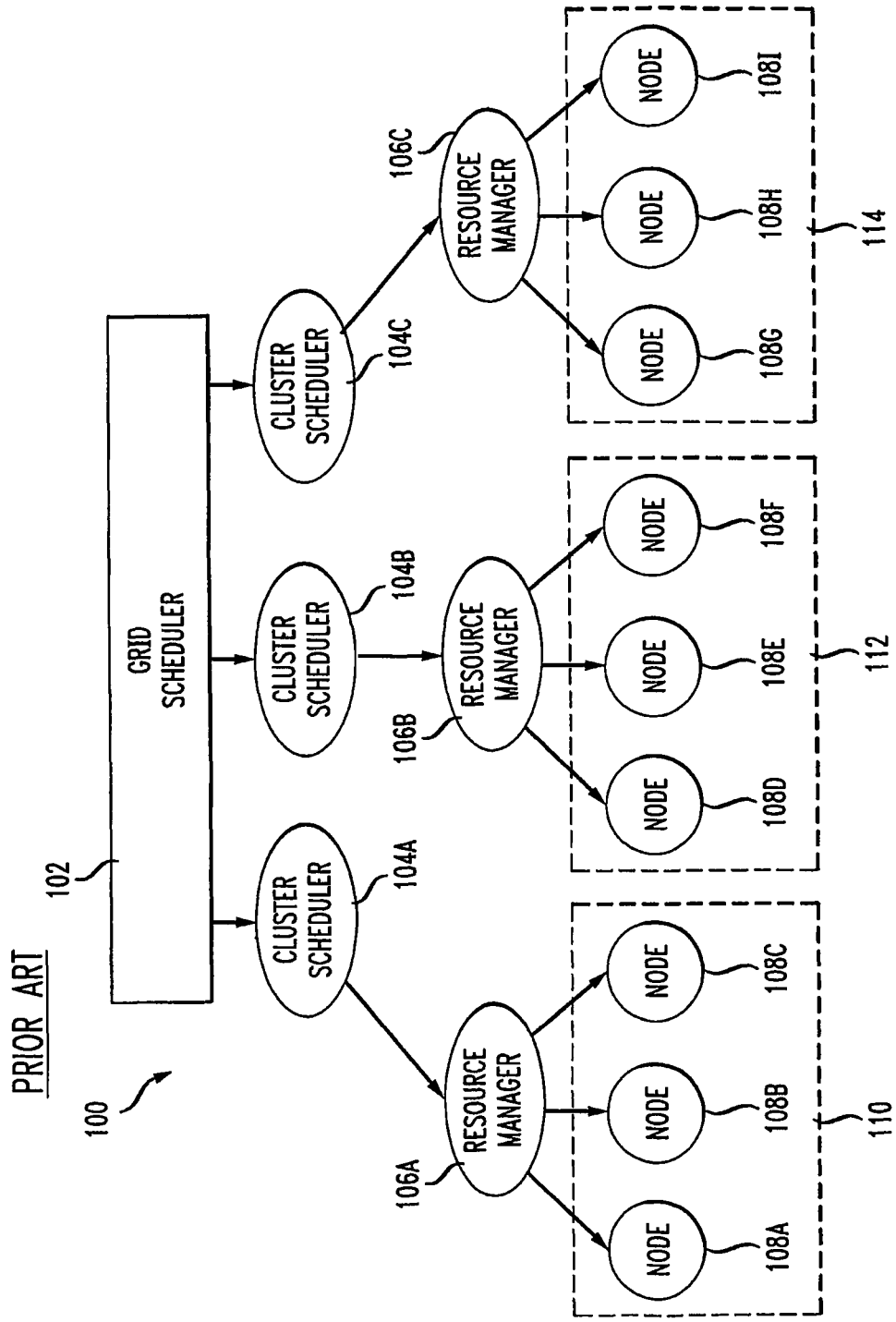
FIG. 1A illustrates generally a grid scheduler, cluster scheduler, and resource managers interacting with compute nodes.
Figure 1B:
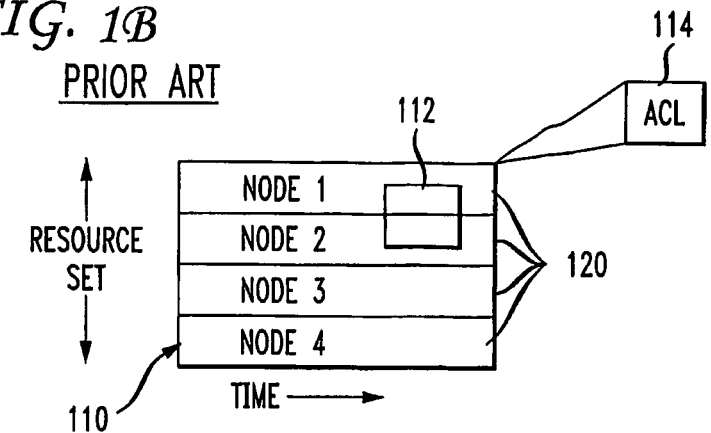
FIG. 1B illustrates an access control list (ACL) interacting with a group of nodes.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention relates to resource reservations in the context of a cluster environment. The cluster may be operated by a hosting facility, hosting center, a virtual hosting center, data center, grid, cluster and/or utility-based computing environments. Software modules and components operate within a computing environment to manage the reservations of resources. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM, storage devices such as hard disks, communication means such as a modem or a card to enable networking with other computing devices, a bus that provides data transmission between various hardware components, a keyboard, a display, an operating system and so forth. There is no restriction that the particular system embodiment of the invention have any specific hardware components and any known or future developed hardware configurations are contemplated as within the scope of the invention when the computing device operates as is claimed.

An advance reservation is the mechanism by which the present invention guarantees the availability of a set of resources at a particular time. With an advanced reservation a site has an ability to actually specify how the scheduler should manage resources in both space and time. Every reservation consists of three major components, a list of resources, a timeframe (a start and an end time during which it is active), and an access control list (ACL). These elements are subject to a set of rules. The ACL acts as a doorway determining who or what can actually utilize the resources of the cluster. It is the job of the cluster scheduler to make certain that the ACL is not violated during the reservation's lifetime (i.e., its timeframe) on the resources listed. The ACL governs access by the various users to the resources. The ACL does this by determining which of the jobs, various groups, accounts, jobs with special service levels, jobs with requests for specific resource types or attributes and many different aspects of requests can actually come in and utilize the resources. With the ability to say that these resources are reserved, the scheduler can then enforce true guarantees and can enforce policies and enable dynamic administrative tasks to occur. The system greatly increases in efficiency because there is no need to partition the resources as was previously necessary and the administrative overhead is reduced it terms of staff time because things can be automated and scheduled ahead of time and reserved.

As an example of a reservation, a reservation may specify that node002 is reserved for user John Doe on Friday. The scheduler will thus be constrained to make certain that only John Doe's jobs can use node002 at any time on Friday. Advance reservation technology enables many features including backfill, deadline based scheduling, QOS support, and meta scheduling.

There are several reservation concepts that will be introduced as aspects of the invention. These include dynamic reservations, co-allocating reservation resources of different types, reservations that self-optimize in time, reservations that self-optimization in space, reservations rollbacks and reservation masks. Each of these will be introduced and explained.

Figure 2A:
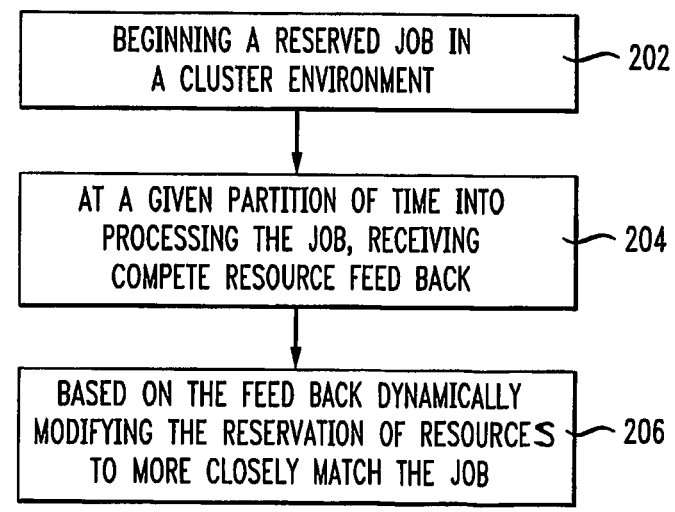
FIG. 2A illustrates a method embodiment of the invention.

Dynamic reservations are reservations that are able to be modified once they are created. FIG. 2A illustrates a dynamic reservation. Attributes of a reservation may change based on a feedback mechanism that adds intelligence as to ideal characteristics of the reservation and how it should be applied as the context of its environment or an entities needs change. One example of a dynamic reservation is a reservation that provides for a guarantee of resources for a project unless that project is not using the resources it has been given. A job associated with a reservation begins in a cluster environment (202). At a given portion of time into processing the job on compute resources, the system receives compute resource usage feedback relative to the job (204). For example, a dynamic reservation policy may apply which says that if the project does not use more than 25% of what it is guaranteed by the time that 50% of its time has expired, then, based on the feedback, the system dynamically modifies the reservation of resources to more closely match the job (206). In other words, the reservation dynamically adjust itself to reserve X % fewer resources for this project, thus freeing up unused resource for others to use.

Another dynamic reservation may perform the following step: if usage of resources provided by a reservation is above 90% with fewer than 10 minutes left in the reservation then the reservation will attempt to add 10% more time to the end of the reservation to help ensure the project is able to complete. In summary, it is the ability for a reservation to receive manual or automatic feedback to an existing reservation in order to have it more accurately match any given needs, whether those be of the submitting entity, the community of users, administrators, etc. The dynamic reservation improves the state of the art by allowing the ACL to the reservation to have a dynamic aspect instead of simply being based on who the requestor is. The reservation can be based on a current level of service or response time being delivered to the requestor.

Another example of a dynamic reservation is consider a user submitting a job and the reservation may need an ACL that requires that the only job that can access these resources are those that have a queue time that is currently exceeded two hours. If the job has sat in the queue for two hours it will then access the additional resources to prevent the queue time for the user from increasing significantly beyond this time frame. You can also key the dynamic reservation off of utilization, off of an expansion factor and other performance metrics of the job.

The ACL and scheduler are able to monitor all aspects of the request by looking at the current job inside the queue and how long it has sat there and what the response time target is. It is preferable, although not required, that the scheduler itself determines whether all requirements of the ACL are satisfied. If the requirements are satisfied, the scheduler releases the resources that are available to the job.

The benefits of this model is it makes it significantly easier for a site to balance or provide guaranteed levels of service or constant levels of service for key players or the general populace. By setting aside certain resources and only making them available to the jobs which threaten to violate their quality of service targets it increases the probability of satisfying it.

Figure 2B:
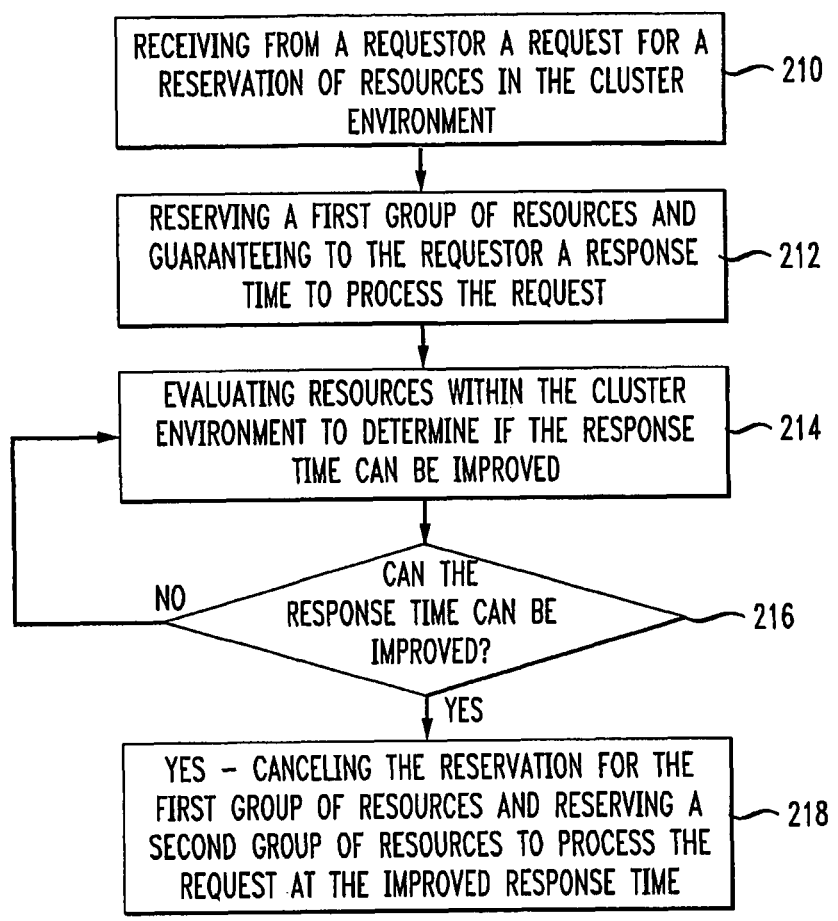
FIG. 2B illustrates another method embodiment of the invention.

Another reservation type is a self optimizing reservation in time. This is shown in FIG. 2B. In many cases, people will request resources and request that they be available at a particular time. For example, a person is doing a demonstration and it happens to be from 2:00 pm to 4:00 pm. In many other cases, people will simply have a deadline or simply want processing as early as possible. With a self-optimizing in time reservation, the scheduler is actually able to lock in a set of resources for a particular request and then over time evaluate the cluster resources and determine if it can actually improve on it and improve on the reservation in such a way as to guarantee that it does not lose the resources that it has already made available.

The method aspect of the invention relates to a method of dynamically controlling a reservation of resources within a cluster environment to maximize a response time for processing the reservation. The method comprises receiving from a requestor a request for a reservation of resources in the cluster environment (210), reserving a first group of resources and guaranteeing to the requester a response time to process the request (212), evaluating resources within the cluster environment to determine if the response time can be improved (214) and determining whether the response time can be improved (216). If the response time can be improved, the system cancels the reservation for the first group of resources and reserves a second group of resources to process the request at the improved response time (218). If the response time cannot be improved, then the system continues to evaluate the resources according to step 214.

The reservation for the first group of resources and the reservation for the second group of resources can overlap in time and/or in terms of the physical resources, or other resources such as software, or license rights, etc. that are reserved. With self-optimizing reservations in time, a particular request may come in request resources that meet the following criteria but the requester prefers resources that meet a more increasingly strict criteria. The scheduler, in finding the reservation, may be able to satisfy the required criteria but not necessarily satisfy all the preferred criteria. Over time, the scheduler, once it has established a reservation that meets the minimum criteria, it can continue to look at newly freed up resources and determine if it can, to a larger and larger extent, satisfy the preferred resource needs as well.

The self optimizing reservation technology is also useful to work around resource failures in the case of a reservation that has already had reserved all the resources it needs and it has a node failure. Other types of resources failures may also be monitored and reservations modified to meet the original promised quality or service or response time to the requester. For example, one the requester submits a request for a reservation of resources, and the system promises a certain response time and reserves a group of resources, the system will monitor those resources for failure. If a component of the group of resources fails, such as a node, or a router, or memory or a CPU, the system will seek to modify the reservation by identifying replacement resources that can be included in the reservation such that the promised quality of service can be met. The system can actually continue to locate resources and reallocate resources that are still up and running and be able to satisfy the time frame it originally promised by excluding the failed node and picking up a newly available compute node. This may be performed by modifying the original reservation, or canceling the original reservation and reserving a second group of resources that excludes the failed resource and includes the reallocated working resource such that the requester maintains his or her quality of service.

The determination of whether the response time can be improved may includes a comparison of a cost of canceling the first group of resources and reserving the second group of resources with the improved response time gained from meeting at least one of the preferred criteria. In this regard, a threshold value may be established that indicates when overall resource efficiency may be improved in that enough of the preferred criteria may be met to overcome the cost of canceling a reservation and establishing a the new reservation of resources.

Figure 4:
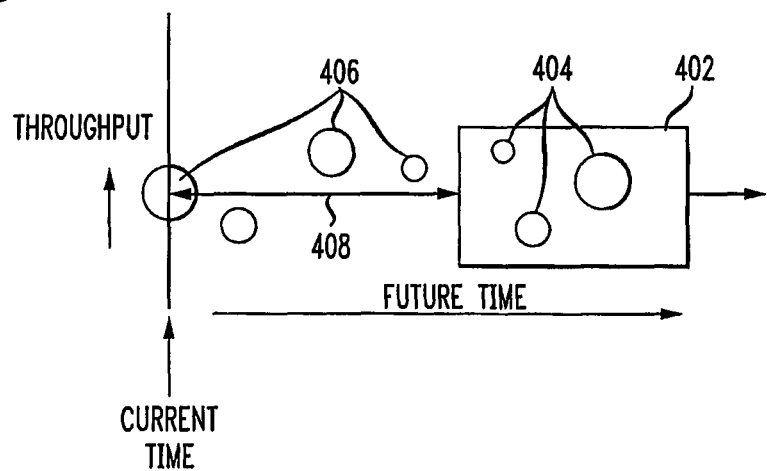
FIG. 4 illustrates a rollback reservation.

FIG. 4 illustrates the roll-back reservation mask 402. An important concept in this type of reservation is that it stays ahead of the current time by either a fixed or dynamic amount of time 408. A method embodiment of this reservation is shown in one aspect in FIG. 2B. As the self-optimization registration slides forward at a fixed (or dynamic) distance in the future (230), it analyses reservations, jobs, objects or other resources 404 (232) and determines whether the level of service may be improved (234). If yes, the method comprises creating a new reservation and making the associated changes (236) and then leaves them 406 behind to be processed when the current time catches up.

A self optimizing reservation will only slide forward barring resource failure of the actual compute resources. It does this by, when it makes a query to determine what resources are available, as part of its algorithm, it determines that it has availability to both free resources and the resources it already has reserved. In such a case in then goes and analyzes it, looks at resources that were recently freed by other workload and other reservations that completed early which is actually quite common in a cluster environment, and if it can find that it can improve the level of service delivered to the request or it will actually create the new reservation and will remove the old reservation and adjust things as needed. A self optimizing reservation therefore has the ability to improve any given attribute of service to the submitting entity, community of users, administrators, etc.

Figure 2C:
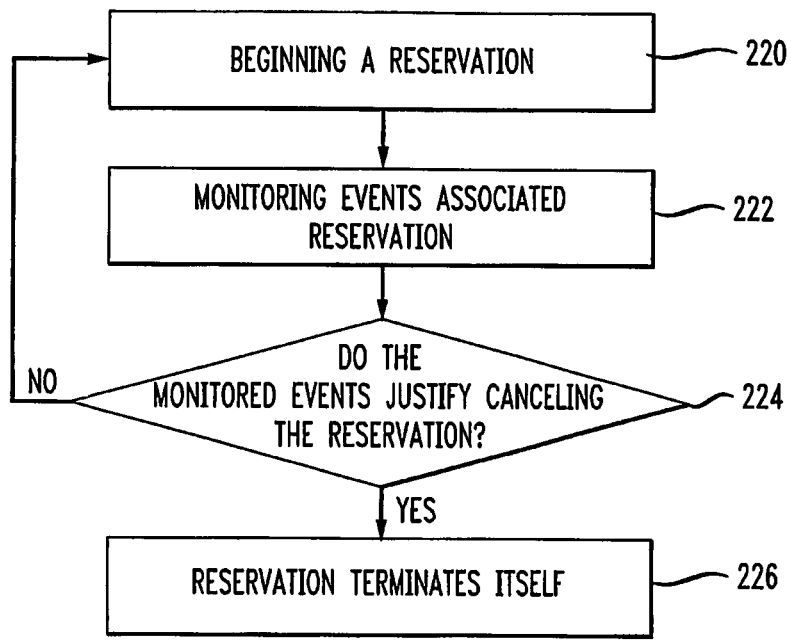
FIG. 2C illustrates yet another method embodiment of the invention.
Figure 2D:
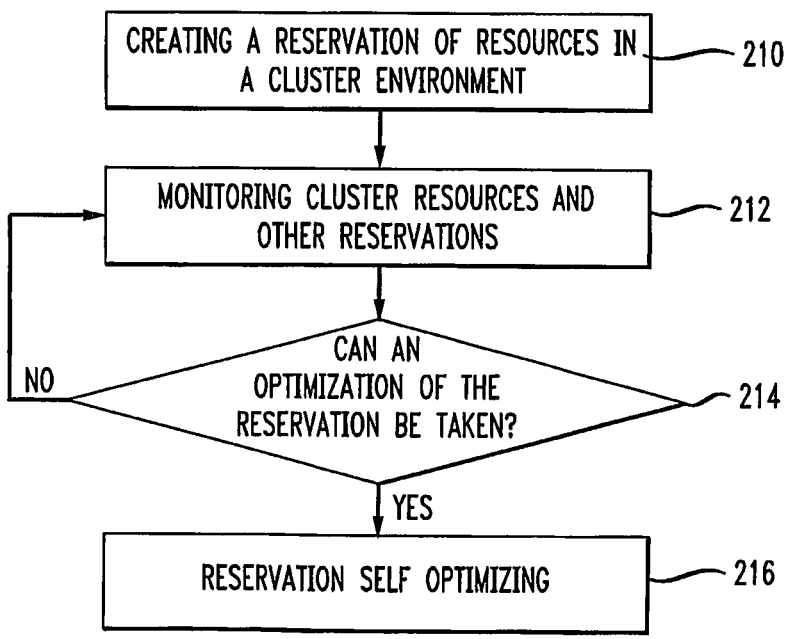
FIG. 2D illustrates yet another method embodiment of the invention.
Figure 2E:
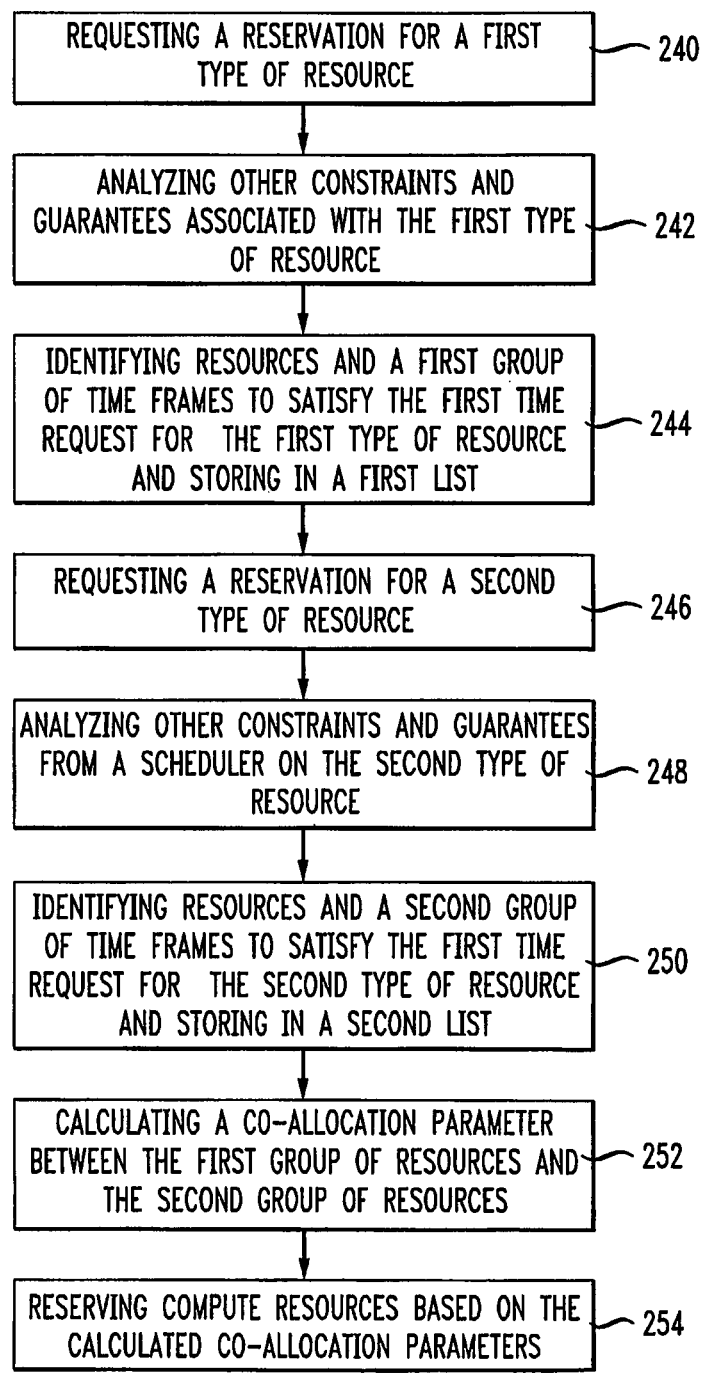
FIG. 2E illustrates yes another method embodiment of the invention.

Another aspect of the self-optimizing reservation in time is illustrated in FIG. 2D. A reservation is created for a job on a cluster environment (210). Self optimizing may consist of improving response time, starting the reservation earlier if possible, adding additional resources as available, using fewer resources when fewer resources are required. Another example of a self-optimizing reservation is if an organization were trying to guarantee a specific number of compute nodes, say 32 for instance, and at first look the first time that 32 nodes can be available is in three days, but if they were available earlier the using organization would want them earlier. Other reservations and cluster resources are monitored (212). As time goes on, if another reservation ends its usage earlier and now the 32 node reservation can be set up in only 2 days. The system determines whether an optimization of the reservation exits (214). If yes, that an optimization exists, the reservation self-optimizes (216) and changes its start date ahead by one day. If no optimization can occur, the system continues to monitor the cluster resources (212). Yet another example of a self-optimizing reservation is that a group reserves 8 nodes for 4 hours, but would really prefer to get more nodes to get the work done faster. Due to another reservation concluding early, this reservation can now self-optimize and run the jobs on 32 nodes for just one hour and the using group is done four times faster.

Another reservation is the self-terminating reservation. FIG. 2C illustrates this reservation. A self-terminating reservation is a reservation that can cancel itself if certain criteria take place. As a reservation time begins for a job (220), the system monitors for jobs and cluster resources (222). An example of a self-terminating reservation is a reservation that uses an event policy to check that if after 30 minutes no jobs have been submitted against the reservation, or if utilization of the assigned resources is below x % then the reservation will cancel itself, thus making those resources available to be used by others. Thus, if monitored events justify terminating the reservation (224), then the reservation terminates itself (226). If the monitored events do not justify canceling the reservation, the system continues to monitor events (222).

Figure 3A:
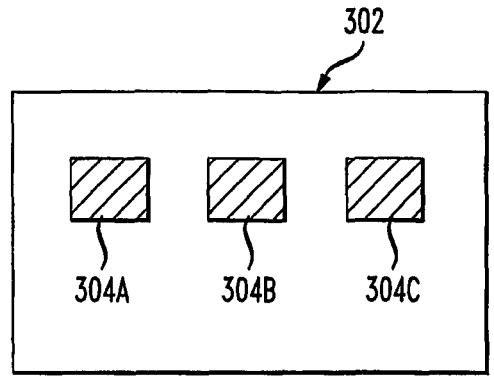
FIG. 3A illustrates a reservation sandbox.

FIG. 3A illustrates a standing reservation. In cluster 302, there are standing reservations shown as 304A, 304B and 304C. These reservations show resources allocated and reserved on a periodic basis. These are consuming reservations meaning that cluster resources will be consumed by the reservation.

Another embodiment of reservation is something called a reservation mask, which allows a site to create "sandboxes" in which other guarantees can be made. The most common aspects of this reservation are for grid environments and personal reservation environments. In a grid environment, a remote entity will be requesting resources and will want to use these resources on an autonomous cluster for the autonomous cluster to participate. In many cases it will want to constrain when and where the entities can reserve or utilize resources. One way of doing that is via the reservation mask.

Figure 3B:
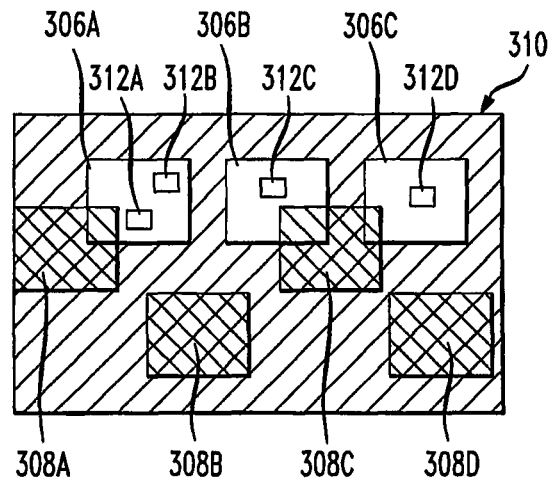
FIG. 3B illustrates aspects of a reservation sandbox.

FIG. 3B illustrates the reservation mask shown as creating sandboxes 306A, 306B, 306C in cluster 310 and allows the autonomous cluster to state that only a specific subset of resources can be used by these remote requesters during a specific subset of times. When a requester asks for resources, the scheduler will only report and return resources available within this reservation, after which point the remote entity desires it, he can actually make a consumption reservation and that reservation is guaranteed to be within the reservation mask space. The consumption reservations 312A, 312B, 312C, 312D are shown within the reservation masks.

In cluster 310 the reservation masks operate differently from consuming reservations in that they are enabled to allow personal reservations to be created within the space that is reserved. ACL's are independent inside of a sandbox reservation or a reservation mask in that one can also exclude other requesters out of those spaces so they're dedicated for these particular users.

The benefits of this approach include preventing local job starvation, and providing a high level of control to the cluster manager in that he or she can determine exactly when, where, how much and who can use these resources even though he doesn't necessarily know who the requesters are or the combination or quantity of resources they will request. The administrator can determine when, how and where requesters will participate in these grids. A valuable use is in the space of personal reservations which typically involves a local user given the authority to reserve a block of resources for a rigid time frame. Again, with a personal reservation mask, the requests are limited to only allow resource reservation within the mask time frame and mask resource set, providing again the administrator the ability to constrain exactly when and exactly where and exactly how much of resources individual users can reserve for a rigid time frame. The individual user is not known ahead of time but it is known to the system, it is a standard local cluster user.

The reservation masks 306A, 306B and 306C define periodic, personal reservation masks where other reservations in a cluster 310 may be created, i.e., outside the defined boxes. These are provisioning or policy-based reservations in contrast to consuming reservations. In this regard, the resources in this type of reservation are not specifically allocated but the time and space defined by the reservation mask cannot be reserved for other jobs. Reservation masks enable the system to be able to control the fact that resources are available for specific purposes, during specific time frames. The time frames may be either single time frames or repeating time frames to dedicate the resources to meet project needs, policies, guarantees of service, administrative needs, demonstration needs, etc. This type of reservation insures that reservations are managed and scheduled in time as well as space. Boxes 308A, 308B, 308C and 308D represent non-personal reservation masks. They have the freedom to be placed anywhere in cluster including overlapping some or all of the reservation masks 306A, 306B, 306C. Overlapping is allowed when the personal reservation mask was setup with a global ACL. A global ACL is an ACL that anyone can use. It is wide open in the sense that anyone can take advantage of the resources within that space. To prevent the possibility of an overlap of a reservation mask by a non-personal reservation, the administrator can set an ACL to constrain it is so that only personal consumption reservations are inside. These personal consumption reservations are shown as boxes 312B, 312A, 312C, 312D which are constrained to be within the personal reservation masks 306A, 306B, 306C. The 308A, 308B, 308C and 308D reservations, if allowed, can go anywhere within the cluster 310 including overlapping the other personal reservation masks. The result is the creation of a "sandbox" where only personal reservations can go without in any way constraining the behavior of the scheduler to schedule other requests.

Another reservation type is the reservation roll-back shown in FIG. 4. This reservation has particular application for enforcing policies or allowing support for service level guarantees in service level agreements. A level of service guarantee allows a site or cluster to guarantee that a particular consumer or organization or type of credential is guaranteed a certain quantity of resources within a certain amount of time. The standard way to provide those guarantees would be to dedicate a block of resources that satisfy the needs and would be statically and rigidly partitioned so that no one else could access it. The request of that organization could not extend beyond the bounds of the dedicated block.

With the present invention regarding the reservation rollback, an administrator can create a reservation 402 which enforces its policy and continues to float in time a certain distance 408 ahead of the current time. Typically the rectangular area of the reservation has a height that corresponds to guaranteed throughput when processing jobs and the horizontal distance that corresponds to the length in time of the reservation. The reservation 402 may correspond to a certain amount of time according to a service level agreement, such as 3 or 4 months for example. The reservation 402 may extend into infinity as well if there is no defined ending time. The reservation 402 is a provisioning reservation and maintains the time offset 402 to the current time.

To illustrate the reservation roll-back, consider a service level agreement with a company to have twenty resources available within one hour of the request for the resources and that they can make the request anytime. The time offset 408 can then be set to one hour and the company will never will they wait more than one hour to get up to twenty resources. The reservation 402 monitors the resources and when a request is made for resources, consumption reservations 404 are allocated and left behind 406 as the roll-back reservation maintains its offset.

An implementation with reservation rollback would allow a site to set up basically a floating reservation that extends from one hour in the future until a time further in the future, such as 4 or 8 hours in the future, and continues to slide forward in time. The reservation 402 will only allow jobs from this organization can drop down requests or reserve host resources underneath the reservation. As time moves forward, the reservation slides forward in time so it always maintains a constant distance in the future allowing these guarantees 404 to be created and maintained 406 on the cluster.

The time offset 408 may be static or dynamic. A static offset 408 will maintain a constant offset time, such as one hour into the future. The static offset will likely be set by a service level agreement wherein a company requests that the resources become available within an hour. The offset 408 may also by dynamic. There may be requests in the service level agreement where under a given event or set of events, the offset would change wherein the reservation slides closer or farther away from the current time to provide a guarantee of resources within ½ (instead of 1 hour) or 2 hours in the future. There are a variety of ways to vary the offset. One can be to simply cancel the current sliding reservation and create a new reservation at a different offset. Another way would be to maintain the current reservation but slide it closer or farther away from the current time. The factors that adjust the dynamic nature of the offset may be based on company requests, the nature and use of the cluster resources, the time the request is made, historical information, and so forth. For example, if the request for resources is made at midnight on a Friday night, perhaps instead of the 1 hour availability of resources, the hosting center analyzes the cluster resources and the time of the request and determines that it can deliver the resources in ½. The company may want a flexible offset where if the request is made during a block of time such as between 3-4:30 pm (near the end of the work day) that the offset be shorted so that the job can be processed sooner. The modifications to the offset may be automatic based on a feedback loop of information or may be adjustable by an administrator.

Figure 5:
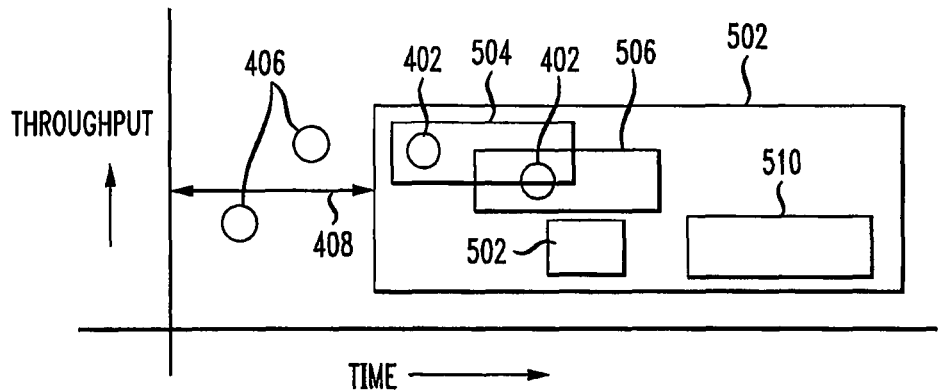
FIG. 5 illustrates another aspect of the rollback reservation.
Figure 6:
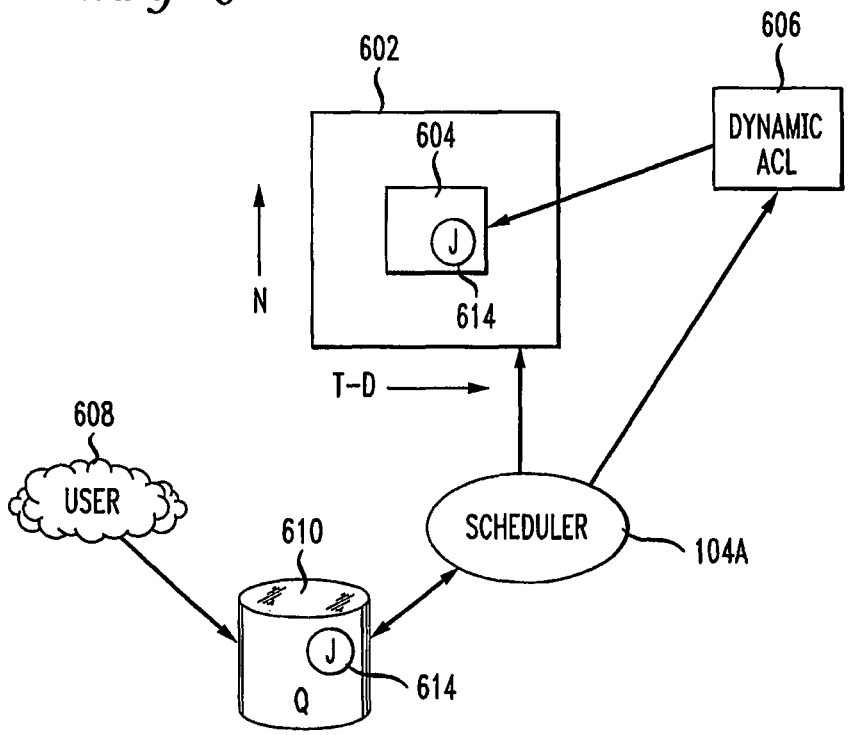
FIG. 6 illustrates a dynamic access control list.

The reservation rollback policy mask is stackable allowing multiple different types of service or service level agreements to be simultaneously satisfied and share a collection of resources. This feature is illustrated in FIG. 5. A reservation 502 is shown and can generally be considered as an aggregation of requests from various masks 504, 506, 508 510. These are aggregated into one space 502 which will then allow reservations to be created on a first come first serve basis, or based on other factors. If these reservation masks 504, 506, 508 and 510 are stacked with individual offsets from the current time (not shown), the administrator can allow the masks to be partitioned among consumers. A useful component of this stackable approach is the capability to have an enveloping reservation 502 created with a total quantity of resource and rollback time offset 408 and a duration to the end of the SLA. Once that reservation space is established or paid for, as a service, the hosting center sub-partitions the space using reservation to provide service guarantees, response time guarantees, quantity or resources guarantees taking advantage of the stacking capability.

A company may therefore establish the enveloping reservation 502 and request from the hosting center that they partition the space according to various organizations within the enveloping reservation 502. This eliminates the need for a large entity to have its own group of clusters of computer.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:
receiving from a requestor, at a first time, a request for an advance reservation of resources in a compute environment, wherein:
the request comprises at least one of a required criteria and a preferred criteria;
the advance reservation is associated with a first group of resources, the first group of resources meeting the required criteria, for use at a second time that is later than the first time; and
when the advance reservation is set, the second time is set as a fixed time for workload to use the first group of resources;
evaluating, prior to the second time, resources within the compute environment to determine if the second time should be modified to determine if the preferred criteria can be met by migrating the advance reservation in time, to yield an evaluation;
if the evaluation indicates that the second time for the advance reservation should be modified, comparing the advance reservation and the first group of resources with a result of migrating the advance reservation from the first group of resources at the second time to a second group of resources at a third time, to yield a comparison; and
if the comparison indicates that a benefit would exist due to the result of migrating the advance reservation relative to using the advance reservation and the first group of resources, then migrating, prior to the second time, the advance reservation from the first group of resources at the second time to the second group of resources at the third time.

2. The method of claim 1, wherein the compute environment is one of an enterprise compute farm, a cluster and a grid.

3. The method of claim 1, wherein the advance reservation is used to guarantee a response time of a job according to compute environment attributes.

4. The method of claim 1, wherein the second time for the advance reservation further comprises at least one of an earliest possible time to start the advance reservation and an exact time to start the advance reservation.

5. The method of claim 4, wherein the third time for the advance reservation is associated with one of an expanded duration of time for the advance reservation and a contracted duration of time for the advance reservation.

6. The method of claim 1, wherein the third time for the advance reservation is associated with modifying a response time for jobs submitted within the advance reservation.

7. The method of claim 1, further comprising dynamically modifying the second group of resources according to the advance reservation.

8. The method of claim 7, further comprising reserving the second group of resources.

9. The method of claim 7, wherein dynamically modifying the second group of resources further comprises modifying attributes of the second group of resources so as to meet requirements of the request.

10. The method of claim 1, wherein evaluating the resources further comprises identifying at least one of accessible reserved resources and free resources.

11. The method of claim 10, wherein the accessible reserved resources are resources which are contained within a reservation to which the requestor has at least one of ownership of and priority access to.

12. The method of claim 1, wherein the first group of resources and the second group of resources overlap in space and time.

13. The method of claim 1, wherein evaluating the resources further comprises identifying resources that currently meet requestor criteria or could meet the requestor criteria through modifying the resources.

14. The method of claim 1, wherein the request comprises at least one of a requirement and a preference.

15. The method of claim 14, wherein the at least one of a requirement and a preference relates to at least one of a start time, a response time, optimization, quality of service, resource quantity, cost and time duration.

16. The method of claim 1, wherein the request comprises at least one request criteria of: a computer operating system, software, network configuration information, a file system configuration and memory requirements.

17. The method of claim 1, further comprising, after migrating the advance reservation, providing an access list on the advance reservation so as to guarantee a response time for submitted jobs.

18. The method of claim 17, wherein the access list comprises at least one of credential-based data, performance-based data and QOSbased data.

19. The method of claim 1, wherein evaluating the resources further comprises comparing a cost of migrating the advance reservation from the first group of resources at the second time to the second group of resources at the third time with a second benefit gained by meeting at least one of the preferred criteria, and wherein the cost of migrating the advance reservation comprises at least one of: provisioning nodes, dynamically allocating data and network access and allocating software licensing associated with customizing resources to meet a requirement of the requestor.

20. The method of claim 19, wherein the advance reservation is migrated only if the cost of migrating the advance reservation is less than the benefit gained by meeting at least one of the preferred criteria.

21. The method of claim 1, wherein evaluating the resources is based on a per-reservation policy.

22. The method of claim 21, wherein the per-reservation policy is at least one of an administrator policy, a user-based policy, a policy of never taking an action, a policy of always taking an action and a cost-based policy.

23. The method of claim 1, wherein the requestor identifies the request as a self-optimizing request.

24. The method of claim 23, wherein the requestor is charged more for a self-optimizing request.

25. A system comprising:
a processor; and
a computer readable medium storing instructions which, when executed by the processor, cause the processor to perform a method comprising:
receiving from a requestor, at a first time, a request for an advance reservation of resources in a compute environment, wherein:
the request comprises at least one of a required criteria and a preferred criteria:
the advance reservation is associated with a first group of resources, the first group of resources meeting the required criteria, for use at a second time that is later than the first time; and
when the advance reservation is set, the second time is set as a fixed time for workload to use the first group of resources;
evaluating, prior to the second time, resources within the compute environment to determine if the second time should be modified to determine if the preferred criteria can be met by migrating the advance reservation in time, to yield an evaluation:
if the evaluation indicates that the second time for the advance reservation should be modified, comparing the advance reservation and the first group of resources with a result of migrating the advance reservation from the first group of resources at the second time to a second group of resources at a third time, to yield a comparison; and
if the comparison indicates that a benefit would exist due to the result of migrating the advance reservation relative to using the advance reservation and the first group of resources, then migrating, prior to the second time, the advance reservation from the first group of resources at the second time to the second group of resources at the third time.

26. A non-transitory computer-readable storage medium storing instructions, the instructions comprising:
receiving from a requestor, at a first time, a request for an advance reservation of resources in a compute environment, wherein:
the request comprises at least one of a required criteria and a preferred criteria:
the advance reservation is associated with a first group of resources, the first group of resources meeting the required criteria, for use at a second time that is later than the first time; and
when the advanced reservation is set, the second time is set as a fixed time for workload to use the first group of resources;
evaluating, prior to the second time, resources within the compute environment to determine if the second time can be modified to determine if the preferred criteria can be met by migrating the advance reservation in time, to yield an evaluation;
if the evaluation indicates that the second time for the advance reservation should be modified, comparing the advance reservation and the first group of resources with a result of migrating the advance reservation from the first group of resources at the second time to a second group of resources at a third time, to yield a comparison; and
if the comparison indicates that a benefit would exist due to the result of migrating the advance reservation relative to using the advance reservation and the first group of resources, then migrating, prior to the second time, the advance reservation from the first group of resources at the second time to the second group of resources at the third time.

27. The method of claim 1, wherein the benefit comprises at least one of a time benefit and a resource benefit.

28. The method of claim 1, wherein the required criteria and the preferred criteria related to at least one of a time criteria and a resource criteria.

* * * * *